United States Patent [19]
Ikegami et al.

[11] Patent Number: 5,840,268
[45] Date of Patent: Nov. 24, 1998

[54] METHOD FOR PREPARING AN ULTRAFINE POWDER

[75] Inventors: Takayasu Ikegami; Noriko Saito, both of Tsukuba, Japan

[73] Assignee: National Institute for Research in Inorganic Materials, Tsukuba, Japan

[21] Appl. No.: 731,995

[22] Filed: Oct. 23, 1996

[51] Int. Cl.$^6$ ..................................................... C01G 1/02
[52] U.S. Cl. ............................................................ 423/592
[58] Field of Search ............................................. 423/592

[56] References Cited

U.S. PATENT DOCUMENTS 4,140,771  2/1979  Berard et al. ............................ 423/263

*Primary Examiner*—David Brunsman
*Attorney, Agent, or Firm*—Oblon, Spivak, McClelland, Maier & Neustadt, P.C.

[57] ABSTRACT

A method for preparing an ultrafine powder, which comprises forming a precipitate by reacting a hydroxide type precipitate-forming agent to an aqueous solution containing at least one type of metal ions capable of forming a hydroxide type precipitate which forms a stable floc in the presence of sulfate ions, adding sulfate ions before or after forming the precipitate, to let the formed precipitate form a stable floc, and then dispersing the precipitate in an organic solvent without drying it, followed by drying to obtain independently separated amorphous or crystalline primary particles having an average particle size of at most 0.2 $\mu$m.

12 Claims, 2 Drawing Sheets

METHOD FOR PREPARING AN ULTRAFINE POWDER

BACKGROUND OF THE INVENTION

1. Field of the Invention

The present invention relates to preparation of an ultrafine powder of a hydroxide type substantially free from agglomerated particles by preventing formation of dense and hard secondary particles (hereinafter referred to as agglomerated particles) due to rearrangement of primary particles which takes place during drying the precipitate, and an ultrafine oxide powder obtainable by calcining such hydroxide type powder. Further, the present invention relates to a novel method for producing an ultrafine powder free from dense and hard agglomerated particles, wherein primary particles are present as independently separated and which is useful as a powder material for high density sintered bodies or as a catalyst or catalyst carrier.

2. Discussion of Background

A hydroxide type fine powder or a fine oxide powder useful as a powder material for oxide type fine ceramics or as a catalyst or catalyst carrier, has heretofore been produced by various aqueous solution methods, in which a precipitate is obtained by crystallization by a reaction in an aqueous solution, or further calcining the dried powder at a suitable temperature. Further, for a special purpose of producing highly functional ceramics or high performance catalysts, a method of hydrolyzing a compound of a metal with an organic substance such as an alcohol, or a gas phase synthesis for synthesizing a required compound directly in a gas phase reaction, has been developed.

Such aqueous solution methods employ compounds which are relatively stable in aqueous solutions, such as a hydrochloride, sulfate, ammonia and ammonium carbonate. Thus, they have a merit that they are safe so long as the preparation operation is conducted with a common knowledge, and that no special apparatus is required for the synthesis. However, they have a drawback that if primary particles of a hydroxide type precipitate formed by a reaction in an aqueous solution, are fine, such primary particles are likely to undergo rearrangement by the action of water during the drying step to form dense and hard agglomerated particles, whereby the ability as a catalyst or catalyst carrier tends to deteriorate. It is of course true that if primary particles become large, the agglomerated particles tend to be brittle, whereby they may readily be disintegrated, for example, by a mortar. However, if primary particles themselves become large, the specific surface area of the powder decreases in inverse proportion to the particle size, whereby the ability as a catalyst or catalyst carrier tends to deteriorate, and the practical value tends to be lost.

On the other hand, in the case of e.g. a powder material for sintering or an oxide catalyst, an oxide powder is obtained by calcining the precipitate at a temperature higher than the thermal decomposition temperature of the precipitate. In the thermal decomposition, fine oxide crystallites will form in the form of primary particles from crystals of the precipitated compound, whereby seemingly a fine oxide powder can be prepared. However, a number of oxide crystallites formed by the thermal decomposition usually form agglomerated particles which are skeleton particles gathered in the form maintaining the outer shapes of crystals of the compound before calcination. Accordingly, in a case where an oxide powder wherein primary particles are independently separated, is to be prepared by thermal decomposition and calcination, it is not desirable to prepare large precipitates of the compound. Further, even if oxide crystallites are formed by calcining a fine precipitated compound, if the precipitated compound is agglomerated, skeletal structures in the agglomerated state will remain after calcination, whereby it tends to be difficult to separate crystallites as primary particles of the oxide individually.

A precipitate synthesized by an aqueous solution method often washed with organic solvent such as ethyl alcohol and acetone. However, the agglomerate of fine powder synthesized by such a method was so hard that grinding or ball-milling (Ceramurgia International, Vol. 5[4]148–54 (1979)) was required to obtain independently separated primary particles.

Further, in the rather modern method of hydrolyzing an organic compound of a metal, it is necessary to preliminarily prepare a compound of a metal with an organic substance. However, it is not easy to synthesize a compound of a metal with an organic substance, since the metal has a reactivity weaker to an organic solvent than to water. Besides, the synthesized organic compound of a metal readily reacts with water. Accordingly, a special apparatus completely free from moisture, is required for the synthesis. This brings about a drawback that the production cost tends to be high.

In the gas phase synthesis, it is required to hermetically seal the reaction space to prevent penetration of a gas such as oxygen or steam from the atmosphere. Further, the density of the gas is very small at a level of not higher than 1/1000 as compared with the density of a liquid. Accordingly, the amount of a sample which can be prepared by the gas phase synthesis is small, since the amount of the sample which can be prepared per a unit volume of the apparatus for synthesis is proportional to the density of the reaction system. Thus, there has been a drawback that the production cost tends to be high correspondingly.

As a special case, a method for producing an ultrafine yttrium oxide powder employing an organic solvent has been developed (Japanese Examined Patent Publication No. 223619/1983 or Japanese Patent Application No. 100541/1991). In the first invention of Japanese Examined Patent Publication No. 223619/1983, yttrium hydroxide is precipitated from yttrium nitrate, further dispersed in an organic solvent and subjected to distillation under heating under an azeotropic condition of water/organic solvent, and then yttrium hydroxide is dried and calcined to obtain an yttrium oxide powder free from agglomeration, wherein primary particles are independently separated. Further, in the second invention of Japanese Examined Patent Publication No. 223619/1983, the precipitate of yttrium hydroxide is subjected to filtration and then dispersed in an organic solvent, followed by distillation under heating, and then the dried hydroxide is calcined to obtain the same special yttrium oxide powder as in the first invention. However, it is practically difficult to completely prevent agglomeration of fine primary particles, which takes place during the drying step. This is due to the fact that under a condition where no sulfate ions are present on the surface of the precipitate, even if the precipitate is dispersed solely with an organic solvent capable of dissolving water, followed by drying treatment, it is impossible to effectively suppress rearrangement of fine primary particles which takes place during drying the precipitate, and the fact that even if the dispersion is carried out under the above conditions using only an organic solvent which does not substantially dissolve water, followed by drying, it is still difficult to sufficiently remove water from the precipitate, and due to the influence of water remaining at the time of drying the precipitate, agglomeration by rearrangement of fine primary particles, is unavoidable.

On the other hand, a method of Japanese Patent Application No. 100541/1991 has also been developed wherein instead of yttrium hydroxide, yttrium carbonate is precipitated from an aqueous yttrium nitrate solution, followed by substantially the same organic solvent treatment as Japanese Examined Patent Publication No. 223619/1983 to obtain an ultrafine yttrium oxide powder having similar properties.

However, this has a drawback that the amount of ammonium carbonate as a precipitate-forming agent, is restricted, and about $1/3$ of yttrium ions will remain at the time of filtration, thus leading to a poor yield. If the amount of the precipitate-forming agent is increased to increase the yield, a complex salt of yttrium carbonate and ammonium carbonate, having a large particle size of at least 1 $\mu$m, will form. Like the drawback in the preparation of an ultrafine oxide powder by an aqueous solution method as mentioned above, also in the case of this double salt, primary particles of the precipitate are large, and when calcined, a number of primary particles of oxide will agglomerate to form skeletons retaining the skeletal structure of this double salt. Therefore, when a large amount of the precipitate-forming agent is employed to increase the yield of yttrium oxide, there has been a drawback that the original purpose of utilizing an organic solvent to prevent agglomeration of fine primary particles, can not be accomplished.

Further, recently, the present inventors have developed a method for preparing a readily sinterable aluminum oxide powder or yttrium aluminum garnet powder, which is characterized in that organic solvent treatment is applied to an aluminum hydroxide precipitate or to a coprecipitate of aluminum hydroxide and yttrium hydroxide. An aluminum hydroxide precipitate formed under a usual condition is amorphous, or even if crystalline, it will be a precipitate of crystallites far finer than the crystallites of an yttrium hydroxide precipitate. As a result, a mass obtained by drying the aluminum hydroxide precipitate without organic solvent treatment, tends to be extremely hard. Accordingly, this method has a problem that in order to obtain a brittle dried product, strict control of the conditions for precipitation from an aqueous solution and a proper selection of the type of the organic solvent, are required.

SUMMARY OF THE INVENTION

The present invention has been accomplished under the above-described circumstances, and it is an object of the present invention to provide a novel method which is capable of solving various problems of the conventional methods and which makes it possible to produce a fine powder wherein agglomeration of primary particles is negligible to such an extent as being comparable to the rather modern method, by means of an aqueous solution method far simpler than the rather modern method.

As a result of extensive researches in view of the above-described various problems of the prior art, the present inventors have found a method for synthesizing a powder wherein primary particles are present in an individually separated state without hard agglomeration of various types of hydroxide type fine precipitate particles prepared in an aqueous solution system, by effectively utilizing sulfate ions or an organic solvent.

Thus, the present invention provides a method for preparing an ultrafine powder, which comprises forming a precipitate by reacting a hydroxide type precipitate-forming agent to an aqueous solution containing at least one type of metal ions capable of forming a hydroxide type precipitate which forms a stable floc in the presence of sulfate ions, adding sulfate ions before or after forming the precipitate, to let the formed precipitate form a stable floc, and then dispersing the precipitate in an organic solvent without drying it, followed by drying to obtain independently separated amorphous or crystalline primary particles having an average particle size of at most 0.2 $\mu$m.

As an embodiment, the present invention provides the above method wherein a polymer flocculant is used in combination with the sulfate ions to further promote formation of the stable floc thereby to increase the filtration efficiency and at the same time to effectively suppress agglomeration of primary particles due to rearrangement thereof which takes place during the drying.

In each of the above cases, it is preferred that prior to drying the precipitate, the precipitate is dispersed in an organic solvent capable of dissolving water, followed by filtration and then dispersed in an organic solvent in which the solubility of water is negligible, followed by drying.

As a more preferred embodiment, the present invention provides such a method wherein the operation of dispersing the precipitate in an organic solvent capable of dissolving water, followed by filtration, is repeated a plurality of times, and then the precipitate is dispersed in the organic solvent in which the solubility of water is negligible, followed by drying.

Further, the present inventors have found it possible to effectively prevent rearrangement of primary particles, which takes place during drying the precipitate, by sufficiently removing water in the precipitate by means of an organic solvent capable of dissolving water, and then dispersing the precipitate in an organic solvent which does not substantially dissolve water, followed by drying. Accordingly, the present invention provides a method for preparing an ultrafine powder, which comprises forming, without help of sulfate ions capable of controlling agglomeration of primary particles, a precipitate by reacting a hydroxide type precipitate-forming agent to an aqueous solution containing at least one type of metal ions capable of forming a hydroxide type precipitate of which the average particle size of primary particles is at most 0.2 $\mu$m, followed by filtration, dispersing the precipitate, before the precipitate dries up, in an organic solvent capable of dissolving water, followed by filtration, and then dispersing the precipitate in an organic solvent in which the solubility of water is negligible, followed by drying. As a preferred embodiment, the present invention provides such a method wherein a polymer flocculant is used to let the precipitate form a stable floc thereby to increase the filtration efficiency and at the same time to effectively suppress rearrangement of primary particles which takes place during the drying.

As a further preferred embodiment, the present invention provides such a method wherein the operation of dispersing the precipitate in an organic solvent capable of dissolving water, followed by filtration, is repeated a plurality of times, and then the precipitate is dispersed in the organic solvent in which the solubility of water is negligible, followed by drying.

Furthermore, the present invention provides a method for preparing an ultrafine oxide powder, which comprises calcining an ultrafine powder of a hydroxide type compound prepared by any one of the above methods, within a temperature range of from the thermal decomposition temperature of the ultrafine powder to $2/3$ of the melting point of the oxide formed by the thermal decomposition.

DETAILED DESCRIPTION OF THE PREFERRED EMBODIMENTS

Figure 1A:
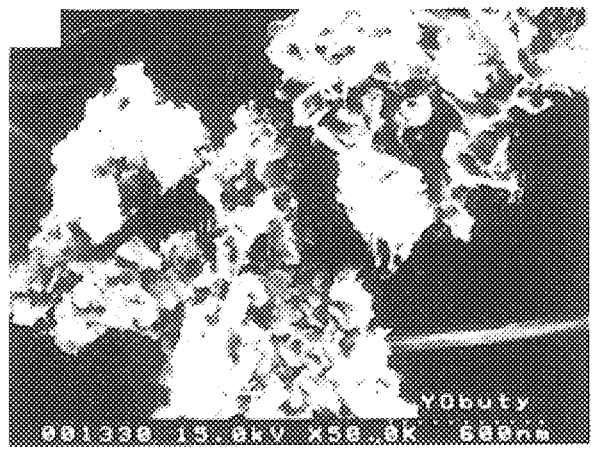
FIG. 1(A) is a scanning electron microscopic photograph (35,000 magnifications) of yttrium hydroxide treated with 0.3 time of sulfate ions+isobutyl alcohol.

According to the present invention, by the above-mentioned methods, it is possible to form a hydroxide type powder and an oxide powder wherein primary particles are as fine as those obtainable by an alkoxide method or a gas phase growing method and nevertheless substantially free from agglomeration, by a chemical technique which is far simpler than the conventional alkoxide method.

(A) Material suitable for this invention

This invention is effective for a material which consists of amorphous or crystalline primary particles having a particle size of at most 0.2 μm and which forms a stable floc of a hydroxide type precipitate in the presence of sulfate ions. The main component metal of the material constituting the precipitate satisfying this condition may, for example, be Be, Mg, Ca, Sr, Ba, Sc, Y, rare earths, a transition metal such as Ti or Fe, Zr, Hf, Nb, Ta, Cr, Mo, W, Al, Ga, In, Si, Ge, Sn, Pb, Sb, or Bi. The type of the metal element as the main component of the precipitate is not particularly limited, so long as it forms a hydroxide type precipitate capable of providing the effects of the present invention. The precipitate is a compound comprising at least one type of these metals, as the main component. The effects of the present invention are obtainable by many hydroxide type precipitates comprising such metals as the main components, since the colloidal nature in the aqueous solutions of such precipitates is similar. This is understandable also from the fact that commercially available polymer flocculants used for cleaning water contaminated with inorganic substances, are essentially of the same component irrespective of the types of inorganic substances.

With respect to a mixture of hydroxides of aluminum and yttrium corresponding to the composition of aluminum hydroxide or yttrium aluminum garnet (YAG), the same effects as characterized by Claim 7 have already been found. However, a further research has been conducted to confirm that the same effects of an organic solvent can be obtained so long as the precipitate is of a hydroxide type of the above group of metals. Therefore, the metal hydroxide may be hydroxides of the above-mentioned group of metals, other than hydroxides of Y and Al in the amounts corresponding to the composition of alumina or YAG. On the other hand, the invention of Claims 1 to 6 is based on the effects of sulfate ions as one important constituting element of the present invention, for suppressing agglomeration of primary particles. In the invention of Claim 8, use of a polymer flocculant is new. The invention of Claims 9 and 10 includes, as one of the important constituting elements of the invention, a new finding that agglomeration of primary particles can more effectively be suppressed by repeating the operation of dispersing the precipitate in an organic solvent capable of dissolving water, followed by filtration, a plurality of times rather than once. By these new features, hydroxide type substances of optional metals including Y and Al in the amounts corresponding to the composition of alumina or YAG, correspond to metal hydroxide type substances of Claims 1 to 6 and Claims 8 to 10.

The concentration of such metal ions may be at any concentration, the upper limit being a saturated solution. However, preferred is a concentration within a range of from 0.05 to 0.5 mol per liter of water, as calculated as the precipitated hydroxide.

Usually, if the precipitate in an aqueous solution is collected by filtration and dried, it becomes a hard block. The hardness of this block is inversely proportional to the size of the primary particles. If the size of primary particles is at least 1 μm, the dried product tends to be very brittle, and the dried product can be disintegrated relatively easily. However, if the size is 0.2 μm or less, the dried product will be a firm block. The main object of the present invention is to provide a method for producing a powder, wherein rearrangement of such primary particles, which takes place during drying the precipitate of fine primary particles of 0.2 μm or less, is suppressed by the action of sulfate ions or an organic solvent, which prevent disintegration of the structure of a floc formed at the time of precipitation and to obtain a powder free from agglomeration, wherein such primary particles are independently separated, even when dried.

(B) Effects of sulfate ions

Usually, aluminum sulfate or aluminum polychloride is, for example, used as an inorganic flocculant. According to the conventional study, the effects of such a flocculant are considered to be such that sulfate ions or chlorine ions neutralize the electric charge of precipitate particles to diminish an electrical repulsion force among the particles and to make the governing force acting among the particles to be the vander Waals force for attracting the particles to one another. Not only these ions but also nitrate ions are, for example, effective for flocculation of a precipitate. However, the present inventors have found that there is a difference in the stability of the floc of a hydroxide-type precipitate depending upon the type of the flocculant. Namely, flocs formed by other than sulfate ions are not very much stable, whereby primary particles readily undergo rearrangement by drying to form dense agglomerated particles. Accordingly, even if a powder is produced in accordance with the method of Claim 1, it has been difficult to completely prevent agglomeration of primary particles, if sulfate ions are not incorporated. Whereas, the structure of the floc formed by sulfate ions is relatively stable, and rearrangement of primary particles which takes place during drying of the precipitate, can be suppressed to some extent. As a result, after flocculation of the precipitated particles by sulfate ions, treatment with an organic solvent is applied, followed by drying, whereby a bulky powder in which primary particles are present in an individually separated state and whereby agglomeration is negligible, is obtainable. The sulfate ions to be used in the present invention as defined in Claims 1 to 6, can be obtained by dissolving sulfuric acid, ammonium sulfate, basic ammonium sulfate or a sulfate of a metal constituting the precipitate in an aqueous solution. However, the type of a compound containing a sulfate ion is not particularly limited so long as it satisfies the purpose of employing sulfate ions. The practically preferred effects of sulfate ions are obtainable when sulfate ions are present in an amount of 0.05 time of the metal ions in the precipitate or in the aqueous solution in a case where no polymer flocculant is present, and they are obtainable when sulfate ions are present in an amount of 0.01 time of the metal ions in a case where the polymer flocculant is present. The stability of the floc of the precipitate increases as the sulfate ions increase. However, no remarkable improvement in effects will be observed when sulfate ions become to be at least 4 times of the total metal ions in the aqueous solution or in the precipitate.

The sulfate ions are used mainly for the purpose of suppressing agglomeration of hydroxide-type ultrafine particles densely, and they will be no longer required once such suppressing effects have been attained. Therefore, it is not desirable to use the sulfate ion source in a large amount, since such will be costly. The practical amount of sulfate ions is within a range of from 0.05 to 4 times, preferably from 0.1 to 3 times, of the total metal ions in a case where no polymer flocculant is employed, and within a range of from 0.01 to 4 times, preferably from 0.03 to 3 times, in a case where a polymer flocculant is employed. However, if the difference between the thermal decomposition temperature of the sulfate and the sintering temperature of the oxide is not substantial as in the case of Mg, Ca, Sr, Ba, Y, rare earth elements, Pb, Bi and In, the sulfate ions remaining after drying, will adversely affect the nature of the powder. For example, with an oxide powder comprising one or more members in the latter element group as the main components, if sulfate ions exceed a certain level, densification during sintering will be hindered. Accordingly, a preferred amount of sulfate ions in a case of producing such an oxide powder, is within a range of from 0.05 to 1.5 times, more preferably from 0.1 to 1.2 times, of the total metal ions in the aqueous solution or in the precipitate in a case where no polymer flocculant is employed, and within a range of from 0.01 to 1.5 times, more preferably from 0.03 to 1.2 times, in a case where a polymer flocculant is employed.

When the hydroxide type precipitate is formed after an addition of sulfate ions to the aqueous solution, the resulting floc will be stable, and the floc state can be maintained even if washing the precipitate with water is repeated. Whereas, if sulfate ions are added after formation of the precipitate for flocculation, the bond of the flocculated particles tends to be weak, and the floc will gradually disintegrate if it is washed with water containing no sulfate ions. Accordingly, in a case where the floc is stabilized by an addition of sulfate ions to the precipitate, it is preferred to wash the precipitate with a liquid containing sulfate ions. Of course, the effects of sulfate ions for preventing agglomeration of primary particles can be obtained even when sulfate ions are added after formation of the precipitate.

(C) Precipitate-forming agent

The hydroxide type precipitate-forming agent to be used in this invention may, for example, be ammonia, urea, ammonium carbonate or ammonium hydrogencarbonate. However, the type is not particularly limited so long as it satisfies the purpose of use as the precipitate-forming agent. The concentration of such a precipitate-forming agent may be at an optional level, with the saturated solution being the upper limit. Preferably, it is at a level of from 0.05 to 3 mol per liter of water. When the above forming agent is to be reacted with metal ions, it may be added in the form of an aqueous solution to an aqueous solution containing metal ions, or may be added directly to an aqueous solution containing metal ions without being dissolved in water.

Most of the hydroxides of the above group of metals precipitate as amorphous or very fine crystallites. Accordingly, if such precipitates are dried by a conventional method, they become firm blocks macroscopically or dense hard agglomerated particles microscopically. The method of the present invention is effective in such a case. Further, a hydroxide of e.g. Mg or Ca may sometimes have a size of their primary particles exceeding 0.2 $\mu$m depending upon the condition for producing the precipitate. If the primary particles are larger than 0.2 $\mu$m, the precipitate will not form so firm blocks even when dried by a conventional method. Therefore, such a case is excluded from the scope of this invention.

Depending upon the type of metal ions, a composite hydroxide may form. For example, when aqueous ammonia is added to an aqueous solution of yttrium nitrate, depending upon the concentration of yttrium nitrate, a double salt of yttrium containing a hydroxyl group and a nitrate group, will form. Even with a double salt, the effects of the present invention will be obtained, so long as the nature of the precipitate is similar to a hydroxide, and the size of primary particles of the formed precipitate is at most 0.2 $\mu$m.

In general, when an aqueous solution containing a precipitate-forming agent at a low concentration, is added to an aqueous solution containing metal ions, the primary particles of the precipitate tend to be large. Inversely, when an aqueous solution containing metal ions at a low temperature, is added to an aqueous solution containing a precipitate-forming agent at a high concentration, fine particles will precipitate. Therefore, in a system wherein large particles are likely to form by a precipitation reaction, preferred results may be obtained, in many cases, by selecting the latter method.

Aluminum or zinc is amphoteric and dissolves in an acid or a base depending upon the pH. In such a case, it is preferred to prepare the precipitate within a pH range where metal ions will completely precipitate.

(D) Dispersion into an organic solvent and drying

At the stage where the precipitate formed from the aqueous solution has been subjected to filtration, the surface of the precipitate particles is covered by a thin film of water. In a subsequent drying step, the water covering the particle surface is removed. By this removal, water molecules present in spaces among the particles will be withdrawn, whereby the spaces among the particles will shrink. At the same time as this shrinkage, rearrangement of particles will proceed to form dense agglomerated particles. As the free water covering the particle surface is removed, the bond strength among particles increases. As the particles become finer, this bond strength increases. When a precipitate of fine particles is dried, it becomes a hard block. This is attributable to this strong bond strength. The ability of an organic solvent to disperse a powder, is not large enough to cut the strong bond among fine particles formed by drying. Accordingly, even if a precipitate once dried is dispersed in an organic solvent, it is not possible to completely destroy the agglomerated structure among primary particles. Therefore, in the present invention, it becomes an essential condition to disperse the precipitate in an organic solvent without drying it. Further, sulfate ions, nitrate ions or chlorine ions remaining in the precipitate may sometimes adversely affect the physical properties of the powder after drying or may adversely affect the environment if discharged in the atmosphere when such a powder is calcined. Among these ions, a very small amount of sulfate ions may inevitably remain by the nature of the present invention, but it is advisable to carry out washing with water within a range not to impair the feature of the present invention and acceptable from the viewpoint of the costs. Washing with water may be carried out by a method which is commonly employed. Further, as water for cleaning, the purity may be at a level which is usually expected, and there is no particular restriction. Usually, deionized water or distilled water is employed.

The state of the precipitate immediately before dispersing in an organic solvent, is not particularly limited so long as the precipitate is not dried in Claims 1 to 6. Namely, the precipitate may be subjected to filtration or decantation, or it may be in a state dispersed in an aqueous solution, to obtain good results. However, by the decantation or dispersion in an aqueous solution, a large amount of an organic solvent is required to remove a large amount of water, and it is preferred to employ filtration, except for a special case such as a case where it takes a long time for filtration as the precipitate is geled. On the other hand, in Claims 7 to 10, an organic solvent capable of dissolving water, is used instead of sulfate ions for the purpose of suppressing rearrangement of primary particles which takes place at the time of drying the precipitate, whereby it is an important essential condition to carry out filtration to remove free water from this precipitate before dispersing it in an organic solvent under a condition within an economical range. It is of course undesirable to carry out the filtration so severely that water molecules strongly adsorbed on the surface of the primary particles are removed, since the primary particles will then undergo rearrangement among themselves and at the same time they will bond strongly to form hard agglomerated particles.

The organic solvent used in this invention will be substituted for the water on the surface of the precipitated particles to weaken the bond strength among the particles of the precipitate and thus serves to prevent formation of dense hard agglomerated particles which are likely to form at the time of drying the precipitate containing water. As such an organic solvent, one selected from hydrophilic or polar organic solvents, such as methyl alcohol, ethyl alcohol, propyl alcohol, butyl alcohol, hexaalcohol or octaalcohol, isoamyl acetate, or polyethylene glycol, may, for example, be mentioned. However, the type is not particularly limited so long as it is one which satisfies the purpose of use of the organic solvent. They may be used alone or in combination as a mixture of two or more of them.

Among these organic solvents, an organic solvent capable of dissolving water such as an alcohol having not more than three carbon atoms, is capable of readily dispersing the precipitate particles in the organic solvent even if the precipitate contains a large amount of water. At the same time, majority of water in the precipitate will be taken into the organic solvent, and the surface of the precipitate will be covered by the organic solvent, whereby the effects of the organic solvent will be attained. However, the organic solvent in this case is not so effective for suppressing agglomeration of primary particles. Accordingly, it is necessary to preliminarily incorporate sulfate ions to sufficiently firmly establish the floc state so as to increase the ability to suppress rearrangement of primary particles which is likely to proceed during drying.

In a case of an organic solvent which does not substantially dissolve water, it is difficult to disperse the precipitate containing water, since water and the organic solvent repel against each other. Accordingly, it is necessary to heat the organic solvent containing the precipitate while stirring, so as to evaporate water covering the powder surface at the same time as evaporating the organic solvent, thereby to substitute molecules of the organic solvent for the water molecules on the surface of the powder.

Evaporation of the organic solvent may be continued to dryness, or after sufficiently covering the surface of the precipitate particles with molecules of the organic solvent, the organic solvent may be removed by filtration. The precipitate obtained by treatment of the method of the present invention by means of an organic solvent which does not substantially dissolve water, forms a block after drying, which is brittle and can be readily finely pulverized by e.g. a mortar, even if this precipitate will not form a so stable floc when dispersed in an aqueous solution.

The effects of the organic solvent in this invention are observed when the amount of the organic solvent is at least 0.1 time of the volume of the precipitate. As the amount of the organic solvent increases, the effects will be improved. However, if the amount exceeds 20 times, no further distinct improvement in the effects will be observed.

To boil a large amount of the organic solvent, it is required to heat for a long period of time with a large quantity of energy. Whereas, by dispersing the precipitate in the organic solvent capable of dissolving water, followed by filtration to effectively remove the majority of water, and then dispersing it in an organic solvent which does not substantially dissolve water, followed by filtration, the amount of the organic solvent to be evaporated can dramatically be reduced. Accordingly, the operation time and the required energy can be reduced, such being desirable.

Further, if the precipitate is subjected to filtration to remove free water and then dispersed in an organic solvent capable of dissolving water, so that water in the precipitate will be dissolved in the organic solvent to sufficiently remove water in the precipitate, the ability for rearrangement of primary particles which takes place during drying will be very weak. Therefore, when a hydroxide is prepared by the method of Claims 7 to 10, sulfate ions for the purpose of suppressing agglomeration of primary particles, as in Claims 1 to 6, may not necessarily be required. On the other hand, it is preferred to repeat an operation of dispersing the precipitate in an organic solvent capable of dissolving water, followed by filtration, a plurality of times, as in Claims 9 and 10, whereby the amount of water contained in the precipitate will be very much reduced, and agglomeration due to rearrangement of primary particles can thereby be further suppressed.

(E) Polymer flocculant

The polymer flocculant to be used in the present invention is to promote flocculation of the hydroxide type precipitate, in combination with sulfate ions in Claims 2, 5 and 6, or solely by the polymer flocculant in Claims 8 and 10. In the present invention, a flocculant of a polyacrylamide type as the main component may, for example, be mentioned, as it is used for flocculation of an inorganic precipitate. However, the type is not particularly limited so long as it satisfies the purpose of use of the polymer flocculant. The colloidal state of an inorganic compound varies substantially depending upon the type of the compound, the condition for forming the precipitate, or the pH of the aqueous solution in which the precipitate is dispersed. Accordingly, various polymer flocculants having the composition varied corresponding to the variety of the colloidal states, have been developed. Therefore, when a polymer flocculant is to be used, it is necessary to select a polymer flocculant most suitable for flocculating the actual precipitate.

A precipitate flocculated solely by a polymer flocculant without addition of sulfate ions, was subjected to treatment with an organic solvent in accordance with Claim 1, whereby the blocks of the precipitate formed by drying were hard, and under this condition, the effects for suppressing agglomeration of primary particles were small.

(F) Calcination

To prepare a material for sintering and an oxide catalyst or catalyst carrier, a compound obtained by precipitation is thermally decomposed to an oxide powder and then calcined. As the calcination temperature becomes high, the particles of the powder will grow. Especially, when the calcination temperature reaches a temperature of at least $\frac{2}{3}$ of the melting point, the growth rate of particles sharply increases. As a result, the specific surface area decreases, and the catalytic activities decrease, and at the same time the sinterability decreases. Therefore, the calcination temperature is preferably within a range of from the thermal decomposition temperature of the precipitated compound to ⅔ of the melting point of the oxide obtained by calcination.

Now, the present invention will be described in further detail with reference to Examples. However, it should be understood that the present invention is by no means restricted by such specific Examples.

EXAMPLE 1

Figure 1B:
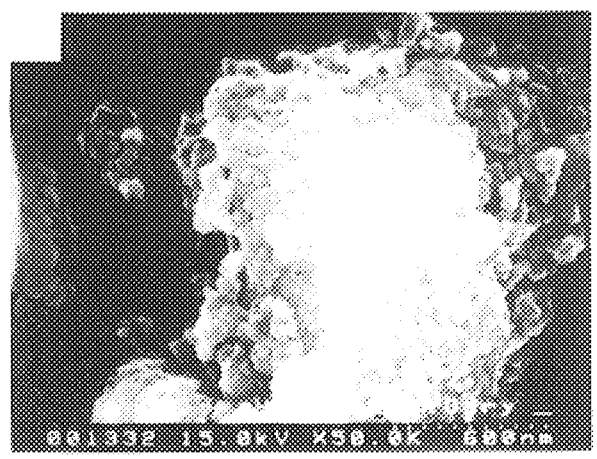
FIG. 1(B) is a scanning electron microscopic photograph (35,000 magnifications) of yttrium hydroxide formed without using treating agents.

60 g of yttrium nitrate was dissolved in 1000 ml of distilled water, and the solution thereby obtained was divided into four solutions. To three solutions except one, an aqueous sulfuric acid solution was added in amounts corresponding to 0.1 time, 0.3 time and 1 time of sulfate ions, respectively, relative to the yttrium ions. These four aqueous solutions were, respectively, added to 1N aqueous ammonia until the pH became 7, to let precipitates form, maintained at 90° C. for 2 hours and then subjected to filtration. To wash the precipitates, dispersion into distilled water and filtration were repeated three times. After the final filtration, one half of each filtrate was dried in a nitrogen gas stream at room temperature. The rest was dispersed in 200 ml of butyl alcohol, and the organic solvent was gently boiled while stirring with a magnetic stirrer equipped with a heater. This boiling was continued for 10 minutes, and then nitrogen gas was introduced to promote evaporation of the organic solvent and to facilitate drying. Blocks of the dried precipitate were disintegrated by an alumina mortar until granular particles were no longer observed. The dried product having the organic solvent treatment applied, could readily be disintegrated to fine powder. Whereas, the dried product having no organic solvent treatment applied, was hard and took a long period of time for disintegration. The disintegrated powder was put into a cylindrical container having one end closed and having a diameter of 24 mm and dropped 50 times from a height of 30 mm, for gentle tapping. From the weight and the volume of the sample, the specific gravity was calculated. By the specific gravity, the degree of agglomeration of the powder was evaluated. The obtained results are shown in Table 1. From this Table, it is evident that in a case where sulfate ions and an organic solvent were used in combination, the powder was well dispersed and highly bulky with little agglomeration. The photograph shown in FIG. 1(A) is a scanning electron microscopic (SEM) photograph of a sample having the organic solvent treatment applied after addition of 0.3 time of sulfate ions, from which it is evident that flat primary particles are randomly directed (some of them are directed substantially perpendicular to other primary particles). Whereas, FIG. 1(B) is a SEM photograph of a sample obtained by drying the precipitate having no sulfate ions incorporated, in a nitrogen gas stream without subjecting it to an organic solvent treatment, from which it is evident that flat primary particles constitute agglomerated particles in a piled state like piled paper sheets (no primary particles which are perpendicular to other primary particles, are observed).

TABLE 1

Tapping specific gravity of yttrium hydroxide

| Ratio of sulfate ions to yttrium ions | No organic solvent treatment | Organic solvent treatment |
| --- | --- | --- |
| 0 | 0.80 | 0.42 |
| 0.1 | 0.77 | 0.38 |
| 0.3 | 0.76 | 0.29 |
| 1.0 | 0.73 | 0.25 |

EXAMPLE 2

37 g of aluminum nitrate was dissolved in 500 ml of distilled water, and the solution was divided into three equal amounts. Into one of them, an aqueous ammonium sulfate solution was added in an amount corresponding to 0.3 time of sulfate ions relative to the aluminum ions. The three solutions were respectively heated to 90° C. with stirring by a magnetic stirrer equipped with a heater, and 1N aqueous ammonia was added thereto until the pH became 7, to let the precipitates form, and they were maintained at 90° C. for 2 hours. The precipitates formed without addition of sulfate ions were designated as samples 1 and 2, and the precipitate formed with addition of sulfate ions, was designated as sample 3. To samples 2 and 3, 2 ml of an aqueous solution of a polyacryloamide type polymer flocculant diluted to 0.1 wt %, was added. With respect to each of samples 1 to 3, washing, dispersion in an organic solvent, followed by evaporation, drying and pulverization of blocks of the precipitate, tapping and measurement of the specific gravity, etc., were carried out in the same manner as in Example 1. The dried products of samples 1 and 2 were hard and took a long period of time for disintegration. The specific gravities of the disintegrated powders were 0.52 with sample 1, 0.50 with sample 2 and 0.32 with sample 3. From these values, it is evident that a highly bulky powder can hardly be obtainable without addition of sulfate ions even if an organic solvent treatment is applied after addition of a polymer flocculant only.

EXAMPLE 3

Under the same conditions as in Example 1, aqueous ammonia and four types of aqueous yttrium nitrate solutions were prepared. Contrary to Example 1, the aqueous ammonia was dropwise added to the respective aqueous yttrium nitrate solutions until the pH became 7, to let the precipitates form, and the solutions were maintained at 90° C. for 2 hours and then subjected to filtration. Washing of the precipitate, dispersion into an organic solvent, followed by evaporation, drying and disintegration of blocks of the precipitate, tapping and measurement of the specific gravity, etc., were carried out in the same manner as in Example 1. The specific gravity obtained was 0.58 with the sample to which no sulfate ions were added, and the specific gravities after tapping of the samples, to the initial solutions of which sulfuric acid was added in amounts corresponding to 0.1 time, 0.3 time and 1 time of sulfate ions relative to the yttrium ions, were 0.51, 0.48 and 0.48, respectively. With respect to the latter three samples, the specific gravities were larger than the powder having the organic solvent treatment applied in Example 1. This is attributable to the fact that large precipitates of primary particles were formed by the reactions in the aqueous solutions.

EXAMPLE 4

Lead nitrate, zirconium oxynitrate, titanium nitrate and lanthanum carbonate were weighed so that the proportions would be 91 of Pb, 9 of Zr, 65 of Ti and 35 of La, and PLZT would be 0.14 mol, and dissolved in 1000 ml of water to obtain an aqueous solution. The aqueous solution was divided into four solutions. To one of them, 1N aqueous ammonia was added until the pH became 8, to let the precipitate form, and the solution was heated at 90° C. for 2 hours and then subjected to filtration. To the remaining three solutions, an aqueous sulfuric acid solution was added in amounts corresponding to 0.1 time, 0.3 time and 1 time of sulfate ions relative to the total metal elements, respectively. To these solutions, 1N aqueous ammonia was respectively added until the pH became 8, to let the precipitates form, and the solutions were heated at 90° C. for 2 hours and then subjected to filtration. The precipitates formed with addition of sulfate ions and the precipitate formed without addition of sulfate ions were respectively subjected to washing of precipitates in the same manner as in Example 1. Then, each of the precipitates was divided into two equal amounts. One half was dried as it was in a nitrogen gas stream at room temperature. The remaining half was dispersed in isobutyl alcohol and then dried in the same manner as in Example 1. Irrespective of the application or non-application of the organic solvent treatment, blocks of the dried precipitates were disintegrated until granular particles were no longer observed in the same manner as in Example 1, and after tapping, the specific gravities were measured. Blocks of the sample to which no organic solvent treatment was applied, were very hard and took a long period of time for disintegration. In Table 2, the specific gravities after tapping are shown. From this Table, it is evident that it is possible to obtain a highly bulky powder by treatment with an organic solvent after addition of sulfate ions.

TABLE 2

Tapping specific gravity of PLZT

| Ratio of sulfate ions to total metal ions | No organic solvent treatment | Organic solvent treatment |
| --- | --- | --- |
| 0 | 1.98 | 1.15 |
| 0.1 | 2.01 | 0.94 |
| 0.3 | 1.79 | 0.82 |
| 1.0 | 1.47 | 0.68 |

EXAMPLE 5

50 g of indium chloride was dissolved in 500 ml of distilled water, and 1N aqueous ammonia was added until the pH became 7, to let a precipitate form. Then, the solution was heated at 90° C. for 2 hours and then subjected to filtration. The precipitate was washed in the same manner as in Example 1 and then subjected to filtration. The precipitate obtained by the filtration was divided into four substantially equal portions. One of them is dried in a nitrogen gas stream at room temperature. The dried blocks were firm, and it took a long period of time to disintegrate them by an alumina mortar until granular particles were no longer observed. The remaining three portions were respectively dispersed in 300 ml of distilled water, and an aqueous sulfuric acid solution was added thereto in amounts corresponding to 0.1 time, 0.3 time and 1 time of sulfate ions relative to the indium ions, respectively, followed by heating at 90° C. for one hour, and then subjected to filtration. The precipitates obtained by the filtration were, respectively, dispersed in 200 ml of isopentyl alcohol. Evaporation of the organic solvent, disintegration of blocks of the dried precipitates, tapping and measurement of the specific gravity, were carried out in the same manner as in Example 1. The dried product after the organic solvent treatment, was readily disintegrated to obtain fine powder.

The specific gravity after tapping of the powder obtained without an organic solvent treatment, was 0.78, and the specific gravities of the powders obtained by adding no sulfate ions and 0.1 time, 0.3 time and 1 time of sulfate ions, followed by the organic solvent treatment, were 0.61, 0.52, 0.45 and 0.43, respectively. It is evident that a highly bulky powder can be obtained by the application of the organic solvent treatment after addition of sulfate ions.

EXAMPLE 6

Figure 2:
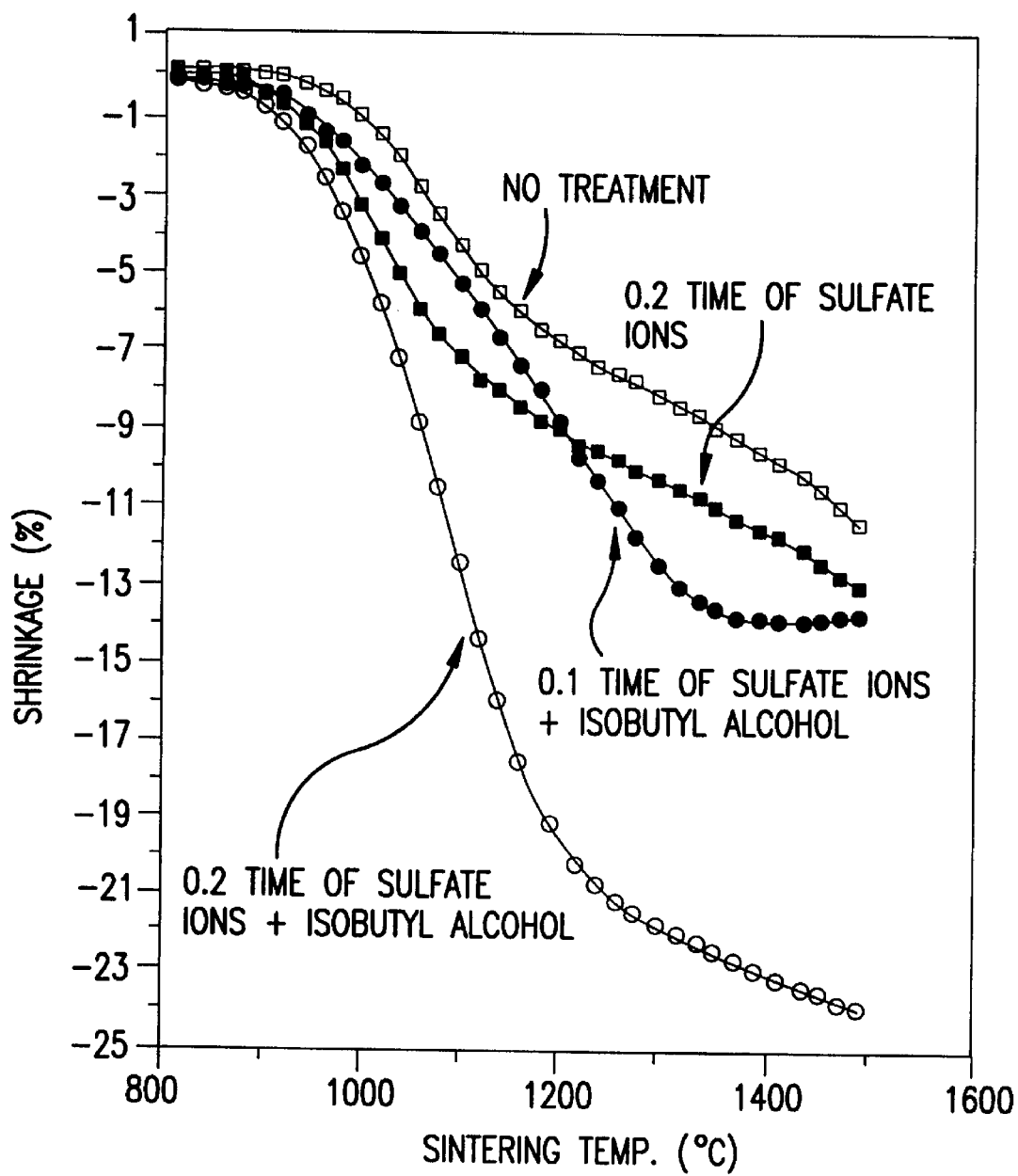
FIG. 2 is a graph for shrinkage curves of yttria-added zirconia with respect to a non-treated case, a case treated with 0.2 time of sulfate ions only, a case treated with 0.1 time of sulfate ions+isobutyl alcohol, and a case treated with 0.2 time of sulfate ions+isobutyl alcohol.

66 g of zirconium oxynitrate and 5.4 g of yttrium nitrate were dissolved in 1000 ml of distilled water. The solution was divided into four equal amounts, which were designated as samples 1 to 4, respectively. To samples 3 and 4, an aqueous sulfuric acid solution was added in amounts corresponding to 0.1 time and 0.2 time of sulfate ions, respectively, relative to the total amount of zirconium ions and yttrium ions. The aqueous solutions of samples 1 to 4 were stirred under heating at about 90° C. by means of a magnetic stirrer equipped with a heater, and 1N aqueous ammonia was added until the pH became 8, to let precipitates form. The solutions were maintained at 90° C. for 3 hours with stirring and then subjected to filtration. Each precipitate was dispersed in an aqueous solution having the pH adjusted to 8 with ammonia, followed by filtration. This operation was repeated three times to remove unnecessary nitrate ions or sulfate ions from the precipitate. Of the precipitates of samples 1 and 2 formed without addition of sulfate ions, the precipitate of sample 1 was dried in a nitrogen gas stream at room temperature. The precipitates of samples 2 to 4 were treated with butyl alcohol, followed by drying, in the same manner as in Example 1. All of the dried products of samples 1 to 4 were disintegrated in the same manner as in Example 1 until granular particles were no longer observed, and then the specific gravities after tapping were measured. The specific gravities after tapping of samples 1 to 4 were 1.23, 0.96, 0.38 and 0.36, respectively. It is evident that a highly bulky powder can be obtained by applying the organic solvent treatment after addition of sulfate ions. Further, each disintegrated powder was calcined at 800° C. for 2 hours in an oxygen gas stream. The calcined powder was formed into tablets under a pressure of 200 MPa. The tablets were heated to 1500° C. at a temperature rising rate of 10° C./min by means of a vacuum sintering furnace, whereby the shrinkage curve due to sintering was measured, and a part of the results is shown in FIG. 2. It is evident that by the alcohol treatment, adequate densification can be accomplished at a lower temperature.

EXAMPLE 7

5 ml of hydrochloric acid was added to 1000 ml of distilled water, and while cooling the solution with ice, 20 ml of titanium tetrachloride was added thereto. 200 ml of this solution was taken, and 1N aqueous ammonia was added thereto to bring the pH to 6, to let a precipitate form, followed by filtration. The precipitate was washed in the same manner as in Example 1. The washed precipitate was designated as sample 1. To the remaining solution, sulfuric acid was added in an amount corresponding to 0.3 time of sulfate ions relative to the titanium ions. To this solution, 1N aqueous ammonia was added to bring the pH to 6, to let a precipitate form, followed by filtration. The precipitate was washed under the same condition as for sample 1, and one half of the precipitate after the final filtration was dispersed in ethyl alcohol. This dispersion was divided into two portions. One of them was heated with stirring by a magnetic stirrer equipped with a heater, to evaporate ethyl alcohol and dried. The dried precipitate was designated as sample 2. The remaining precipitate dispersed in ethyl alcohol was subjected to gentle boiling with stirring by a magnetic stirrer, followed by filtration. The precipitate after the filtration was immediately dispersed in butyl alcohol, and the dispersion was gently boiled for 10 minutes with stirring by a magnetic stirrer, followed by filtration. The precipitate after the filtration was heated and dried at about 100° C. The dried product was designated as sample 3. The remaining half of the sample obtained by filtration after the addition of sulfate ions, was further divided into two equal portions, and the respective portions were dispersed in propyl alcohol and butyl alcohol, respectively. They were gently boiled for 10 minutes with stirring by a magnetic stirrer, and then nitrogen gas was introduced to promote evaporation of the alcohols. The dried samples were respectively designated as samples 4 and 5. In the same manner as in Example 1, the respective dried blocks were disintegrated until granular particles were no longer observed, followed by tapping, and then the specific gravities were measured. The blocks obtained by drying the precipitate of sample 1 took a long period of time for disintegration to diminish granular particles. The dried blocks were brittle and easy to disintegrate in the order of ethyl alcohol, propyl alcohol and butyl alcohol. The specific gravities after tapping of samples 1 to 5 were 0.73, 0.54, 0.36, 0.43 and 0.31, respectively. From these specific gravities, it is evident that the lower the solubility of water, the lower the specific gravity. Further, it is evident that a highly bulky powder having a low bulk density can be prepared also by a method wherein treatment with an organic solvent having a high solubility of water, is followed by treatment with an organic solvent having a low solubility of water, and then the organic solvent is filtered.

EXAMPLE 8

25 g of yttrium hydroxide was precipitated in the same manner as in Example 1 except that no sulfate ions were incorporated. The precipitate was washed and subjected to filtration. Then, ⅕ of the precipitate was dried in a nitrogen gas stream at room temperature. The rest of the precipitate was dispersed in 100 ml of ethyl alcohol, followed by gentle boiling and then by filtration. One half of the precipitate obtained by the filtration was again dispersed in ethyl alcohol, followed by boiling and filtration, under the same conditions. One half of each of these precipitates obtained by the filtration, was dispersed in butyl alcohol, and the organic solvent was gently boiled with stirring by a magnetic stirrer equipped with a heater. This boiling was continued for 10 minutes, and then a nitrogen gas was introduced to promote evaporation of the solvent, and dried. The dried precipitate was disintegrated in the same manner as in Example 1, and then the bulk density after tapping was measured. The bulk density after tapping of the sample which was not treated with the organic solvent was 0.80. Whereas, the bulk densities after tapping of the samples treated once and twice with ethyl alcohol were 0.65 and 0.55, respectively, and the bulk densities after tapping of the samples treated once and twice with ethyl alcohol, followed by dispersion in butyl alcohol and drying, were 0.41 and 0.30, respectively. From these data, it is evident that to produce a powder free from agglomeration, it is preferred to remove water in the precipitate by preliminarily dispersing the precipitate in an organic solvent capable of dissolving water and then treat it with an organic solvent incapable of dissolving water.

EXAMPLE 9

The operation was carried out in the same manner as in Example 8 except that after forming a precipitate of yttrium hydroxide, 10 ml of an aqueous solution of a polyacrylamide type polymer flocculant diluted to 0.1 wt %, was added. The bulk density after tapping of the sample dried without the organic solvent treatment, was 0.75. The bulk densities after tapping of the samples treated once and twice with ethyl alcohol were 0.55 and 0.45, respectively, and the bulk densities after tapping of the samples treated once and twice with ethyl alcohol, followed by dispersion in butyl alcohol and drying, were 0.37 and 0.30, respectively. From these data, it is evident that when a polymer flocculant is used, the bulk density can further be reduced as compared with the case of Example 8. The effects of the polymer flocculant were observed even when no organic solvent was used. However, with the flocculant only, the effects for suppressing agglomeration of primary particles were not adequate. The effects for suppressing agglomeration of primary particles were remarkably improved by combined use of the polymer flocculant and the organic solvent.

As described in detail in the foregoing, according to the present invention, it is possible to form an ultrafine powder of a hydroxide type free from secondary agglomeration by a simple chemical method and to form a fine oxide powder therefrom.

What is claimed is:

1. A method for preparing an ultrafine powder, which comprises forming a precipitate by reacting a hydroxide precipitate-forming agent to an aqueous solution containing at least one metal ion capable of forming a hydroxide precipitate which forms a stable floc in the presence of sulfate ions, adding sulfate ions before or after forming the precipitate, to let the formed precipitate form a stable floc, and then dispersing the precipitate in an organic solvent without drying it, followed by drying to obtain independently separated amorphous or crystalline primary particles having an average particle size of at most 0.2 $\mu$m.

2. The method for preparing an ultrafine powder according to claim 1, wherein a polymer flocculant is used in combination with the sulfate ions to further promote formation of the stable floc thereby to increase the filtration efficiency and at the same time to effectively suppress agglomeration of primary particles due to rearrangement thereof which takes place during the drying.

3. The method for preparing an ultrafine powder according to claim 2, wherein, prior to drying the precipitate, the precipitate is dispersed in an organic solvent capable of dissolving water, followed by filtration and then dispersed in an organic solvent in which the solubility of water is negligible, followed by drying.

4. The method for preparing an ultrafine powder according to claim 3, wherein the operation of dispersing the precipitate in an organic solvent capable of dissolving water, followed by filtration, is repeated a plurality of times, and then the precipitate is dispersed in the organic solvent in which the solubility of water is negligible, followed by drying.

5. The method for preparing an ultrafine powder according to claim 1, wherein, prior to drying the precipitate, the precipitate is dispersed in an organic solvent capable of dissolving water, followed by filtration and then dispersed in an organic solvent in which the solubility of water is negligible, followed by drying.

6. The method for preparing an ultrafine powder according to claim 5, wherein the operation of dispersing the precipitate in an organic solvent capable of dissolving water, followed by filtration, is repeated a plurality of times, and then the precipitate is dispersed in the organic solvent in which the solubility of water is negligible, followed by drying.

7. A method for preparing an ultrafine oxide powder, which comprises calcining an ultrafine powder of a hydroxide compound prepared by the method of claim 1, within a temperature range of from the thermal decomposition temperature of the ultrafine powder to ⅔ of the melting point of the oxide formed by the thermal decomposition.

8. A method for preparing an ultrafine powder, which comprises forming a precipitate by reacting a hydroxide precipitate-forming agent to an aqueous solution containing at least one metal ion capable of forming a hydroxide precipitate of which the average particle size of primary particles is at most 0.2 $\mu$m, followed by filtration, dispersing the precipitate, before the precipitate dries up, in an organic solvent capable of dissolving water, followed by filtration, and then dispersing the precipitate in an organic solvent in which the solubility of water is negligible, followed by drying.

9. The method for preparing an ultrafine powder according to claim 8, wherein a polymer flocculant is used to let the precipitate form a floc thereby to increase the filtration efficiency and at the same time to effectively suppress rearrangement of primary particles which takes place during the drying.

10. The method for preparing an ultrafine powder according to claim 8, wherein the operation of dispersing the precipitate in an organic solvent capable of dissolving water, followed by filtration, is repeated a plurality of times, and then the precipitate is dispersed in the organic solvent in which the solubility of water is negligible, followed by drying.

11. The method for preparing an ultrafine powder according to claim 8, wherein the operation of dispersing the precipitate in an organic solvent capable of dissolving water, followed by filtration, is repeated a plurality of times, and then the precipitate is dispersed in the organic solvent in which the solubility of water is negligible, followed by drying.

12. A method for preparing an ultrafine oxide powder, which comprises calcining an ultrafine powder of a hydroxide compound prepared by the method of claim 7, within a temperature range of from the thermal decomposition temperature of the ultrafine powder to ⅔ of the melting point of the oxide formed by the thermal decomposition.

\* \* \* \* \*

UNITED STATES PATENT AND TRADEMARK OFFICE
CERTIFICATE OF CORRECTION

PATENT NO. : 5,840,268
DATED : November 24, 1998
INVENTOR(S) : Takayasu IKEGAMI et al.

It is certified that error appears in the above-indentified patent and that said Letters Patent is hereby corrected as shown below:

On the Title page, Item [30], the Foreign Application Priority Data information was omitted. It should read:

--Jan. 18, 1996  [JP]  Japan ............24687/1996--

Signed and Sealed this

Eleventh Day of May, 1999

Attest:

Q. TODD DICKINSON

*Attesting Officer*     Acting Commissioner of Patents and Trademarks